Nov. 22, 1927.  1,650,202
P. EVANS ET AL
FLEXIBLE COUPLING
Filed July 1, 1921   3 Sheets-Sheet 2
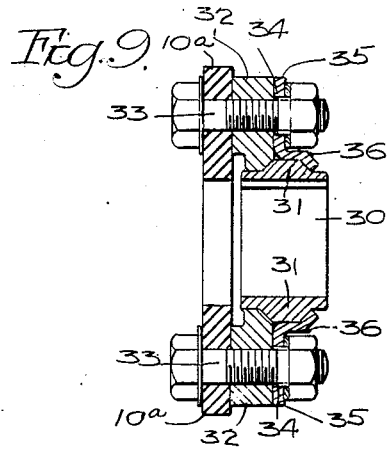
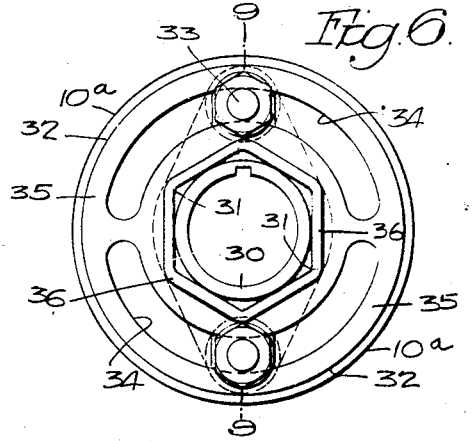
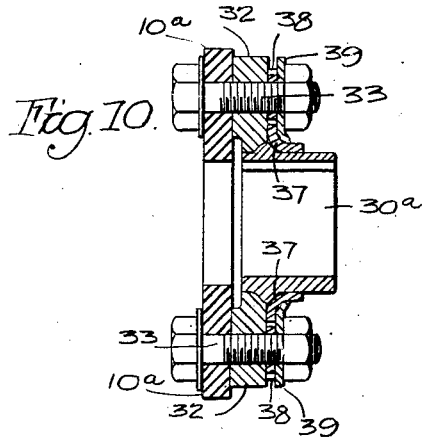
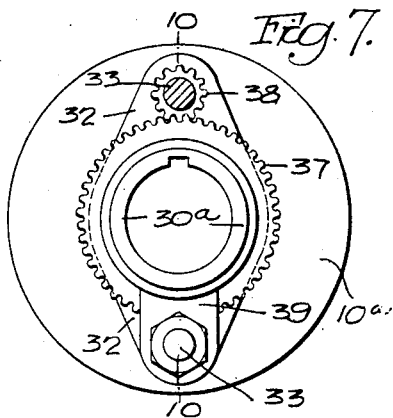
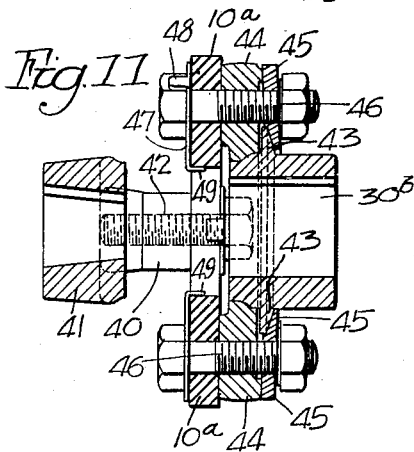
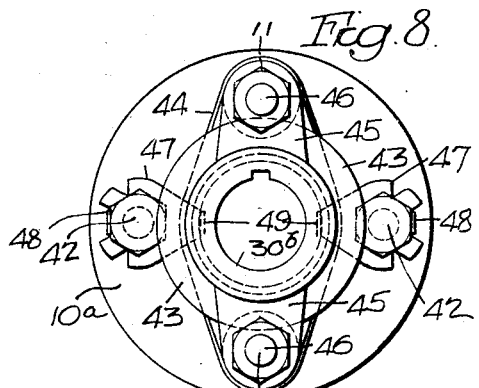

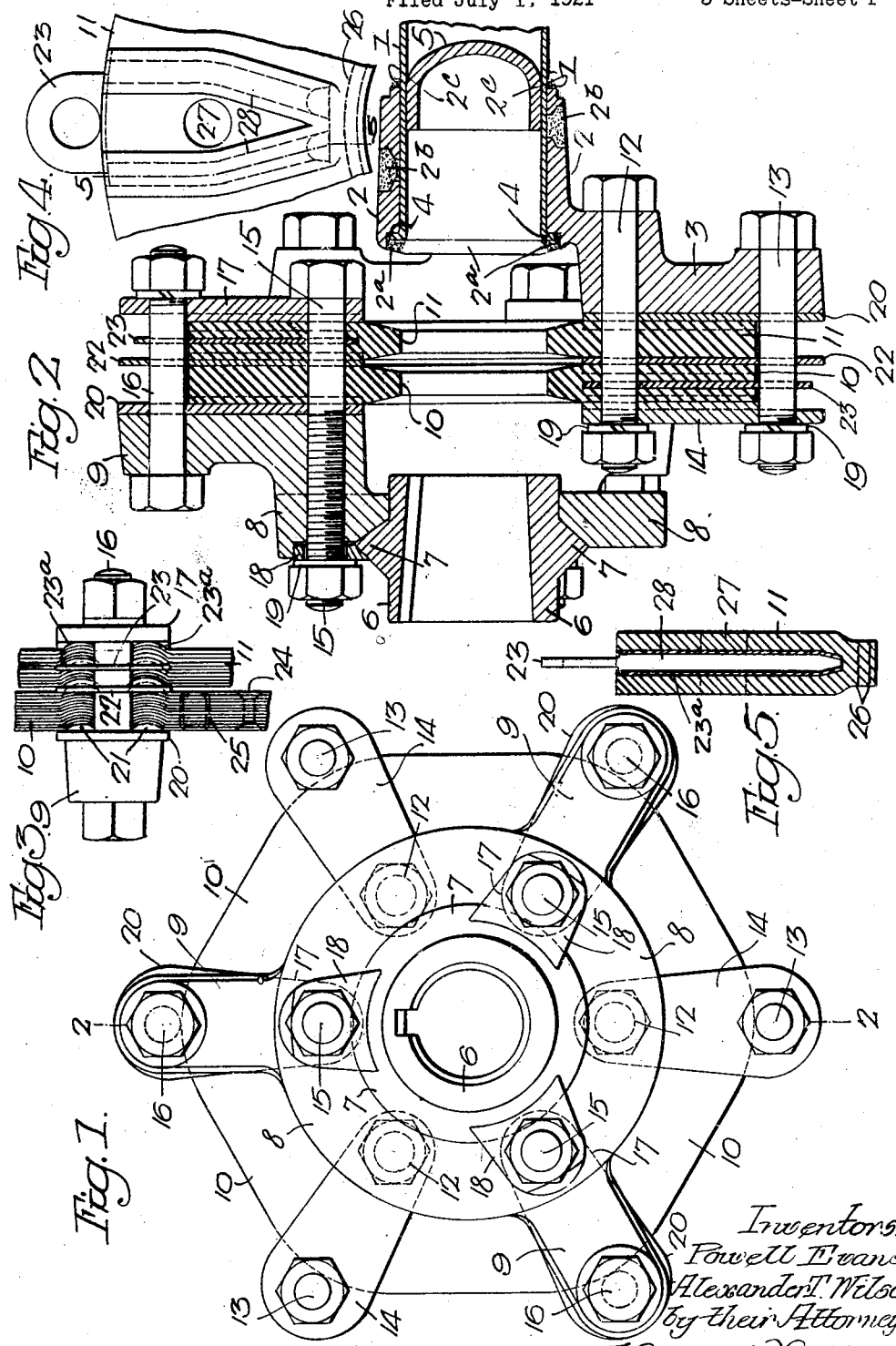

Nov. 22, 1927.  1,650,202
P. EVANS ET AL
FLEXIBLE COUPLING
Filed July 1, 1921   3 Sheets-Sheet 3
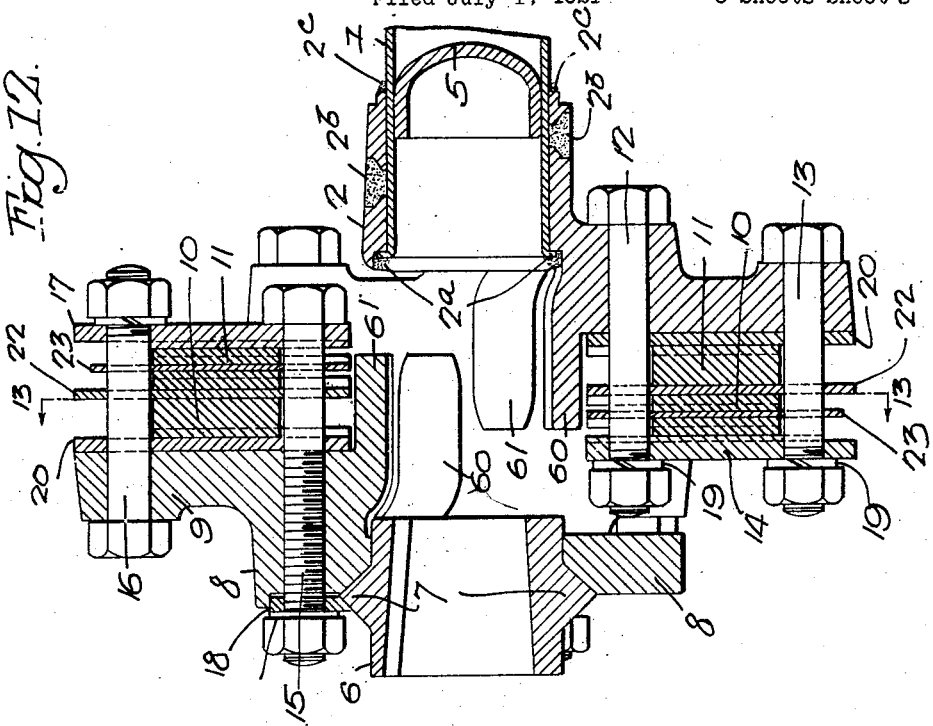
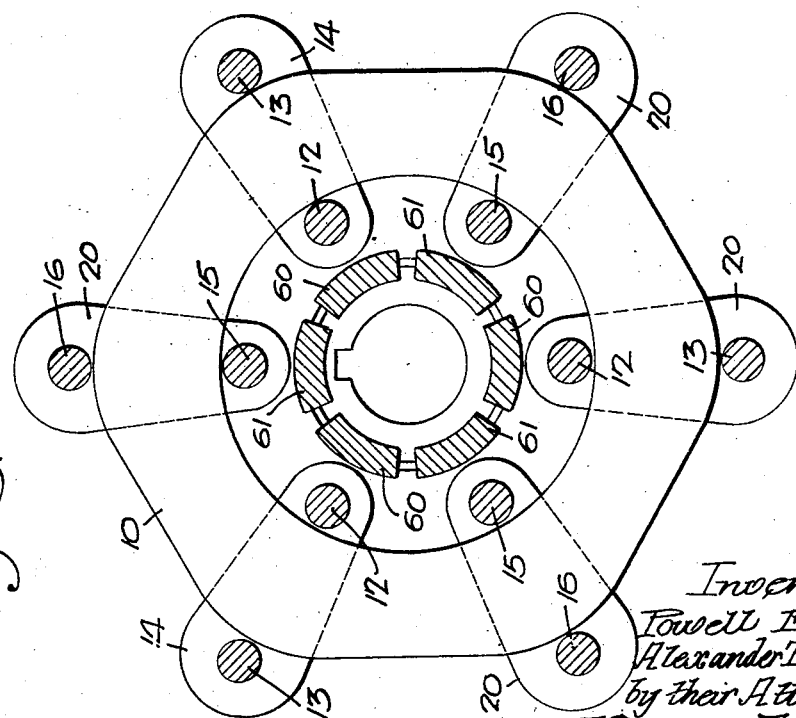

Patented Nov. 22, 1927.

1,650,202

UNITED STATES PATENT OFFICE.

POWELL EVANS AND ALEXANDER T. WILSON, OF PHILADELPHIA, PENNSYLVANIA, ASSIGNORS TO SAID POWELL EVANS.

FLEXIBLE COUPLING.

Application filed July 1, 1921. Serial No. 481,790.

One object of this invention is to provide a relatively simple and substantial form of coupling for the adjacent ends of two shafts, of such a nature as to permit power to be transmitted from one to the other even though they should be out of alignment to a greater or less extent.

The invention further contemplates a construction which will permit of angular adjustment of one part of the coupling relatively to the other portions thereof.

Another object of the invention is to provide a novel form and construction of power transmitting, flexible disc or plate for use in flexible couplings, which shall include novel means for insuring distribution of the force transmitted to or from it over relatively extensive portions of its body and shall also include novel means whereby its laminations are reinforced and bound together.

We further desire to provide a flexible coupling including novel means for adjustably clamping certain of its parts together so as to make possible the convenient angular adjustment of one of said parts and hence of the shaft to which it is connected, relatively to others of the parts and to the second shaft which is associated with the coupling.

Another object of our invention is to provide novel means for preventing abnormal stressing of the flexible disc or discs of a coupling of the above type when a sudden or abnormal load is applied thereto and with this idea in view the invention includes a construction whereby under the above conditions, power is temporarily transmitted directly from one of the spiders of the coupling to the other.

These objects and other advantageous ends we attain as hereinafter set forth, reference being had to the accompanying drawings, in which, Fig. 1 is an end elevation of a flexible coupling constructed in accordance with our invention;

Fig. 2 is a transverse vertical section on the line 2—2, Fig. 1;

Fig. 3 is a fragmentary plan, further illustrating certain parts of the couplings shown in Figs. 1 and 2;

Figs 4 and 5 are respectively a fragmentary elevation and a vertical section on the line 5—5, Fig. 4, illustrating a modified construction of a flexible disc forming part of my invention;

Figs. 6, 7 and 8 are end elevations, illustrating various means for connecting the parts of the coupling to permit of their angular adjustment;

Figs. 9, 10 and 11 are vertical sections on the lines 9—9, 10—10 and 11—11 of Figs. 6, 7 and 8 respectively; and Figs. 12 and 13 are respectively a longitudinal vertical section and a transverse vertical section, illustrating our coupling as constructed to prevent injury to the flexible disc or discs from abnormal or suddenly applied stresses.

In Figs. 1 to 3 of the above drawings, 1 represents a tubular shaft section having welded to one end a sleeve or collar 2 having in the present instance three integral, radially projecting arms 3 constituting a spider. For this purpose the edge of the shaft end is flanged in the present case outwardly as at 4 and projects into the counter bored end of the sleeve to which it is secured by an annular weld $2^a$; the body of said sleeve having formed in it a suitable number of countersunk passages filled with welding material $2^b$. The inner end of the sleeve may also be secured to the shaft 1 by an annular weld $2^c$ and we have found it advantageous to close the shaft as well as reinforce it by a dished, curved-bottom head 5 having a pressed fit or welded within the same preferably adjacent the inner end of the sleeve 2. The coupling includes a second sleeve or collar 6, in the present instance internally tapered for the reception of the similarly formed end of a second shaft (not shown) and formed with a flange 7 having inclined sides beyond which it has adjustably mounted upon it the hub 8 of a second spider structure including three radial arms 9.

Between the two spider structures 3 and 9 are mounted one or more flexible discs indicated at 10 and 11 and made of suitable material such as a series of layers of rubberized fabric vulcanized together. The discs in the present instance are connected to the arms of the spider 3 by two sets of bolts 12 and 13 of which those of the first set extend through said spider, through both of the discs and through the inner end of a radially extending metal plate 14. The bolts 13 of the second set extend respectively between the spider arms 3 and the outer parts of the plates 14, in the present case outside of or radially beyond the peripheries of said discs.

The arms 9 of the second spider are likewise connected to the discs 10 and 11 by two other sets of bolts 15 and 16, of which each of the bolts extends through said discs, through a plate or washer 17 on the outer face of one of the discs, through the arm 9 and are threaded through the hub 8 of the spider 9 and through a washer 18 extending inwardly into engagement with one of the inclined sides of the flange 7 of the shaft-carried sleeve 6, so that when said bolts are tightened they not only clamp the flexible discs between the spider arms 9 and the plate 17, but when their nuts are set up independently clamp the flange 7 between the inclined face of the collar 8 and the inclined edges of the washers 18. Each of the bolts 16 of the second set extends through the clamping plate 17 and one of the arms of the spider 9 outside of the peripheries of the flexible discs 10 and 11, there being lock washers 19 preferably provided for all of said bolts. Obviously without departing from our invention, the outer sets of bolts might go through the discs and the inner bolts through the large central opening in the discs.

In accordance with our invention and for the purpose of widely distributing over the bodies of the flexible discs the torsional stresses to which the coupling is subjected, we provide means whereby portions of these discs are bodily deflected, distorted, or folded in predetermined ways out of their normal planes by molding them or forcing them to assume the desired forms. In the present case with this idea in view we mount between the disc 10 and the spider arms 9 adjacent to it radially extending plates 20 having openings for the bolts 15 and 16 and formed with radially extending curved ribs or corrugations 21 (Fig. 3). These fit depressions or formed recesses in the adjacent face of the flexible disc 10, whose opposite face is formed or forced to provide corresponding outwardly extending ribs or projections which extend radially of the coupling and fit into complementary grooves or depressions in plates 22 interposed between the two discs 10 and 11 (Fig. 3). Said plates in the present case are extended radially out beyond the periphery of the discs and have holes for the passage of the bolts 16, while their faces adjacent the disc 11 are formed with radial projections again fitting complementary recesses in the disc 11. The outer formed face of the latter in turn fits complementary recesses in the plates 17.

Similarly the similar plates 20 and 22 are respectively interposed between the spider arms 3 and the disc 4 and between the latter and the disc 10 and these, as well as the plates 14, are grooved or ribbed as above described so as to form bodily deflections of the material of which the discs are made, adjacent the holes for the bolts 12, 13, 15 and 16, with the result that power is transmitted from the bolts to the plates and by them is distributed to portions of the flexible disc structures distant from the bolt holes.

If desired we may imbed in one or both of the discs radially extending metal spreaders 23 having openings for the passage of the bolts and formed with radial corrugations or ribs 23ª which are complementary to the adjacent portions of the discs so as to distribute the stresses received from the bolts. If it be desired to angularly adjust the sleeve 6 with its shaft relatively to the shaft 1 and its associated parts, the nuts of the bolts 15 may be slacked off and after such adjustment has been made the nuts are again set up so as to cause the flange 7 to be gripped between the collar 8 and the washers 18.

If desired we may bind together or reinforce the laminated or other discs 10 and 11 by transverse rivets 24 (Fig. 3) or by any number of transversely extending hooks or staples 25, as well as by lines 26 of stitching disposed to accomplish the desired results. We may moreover use spreaders of any suitable material (Figs. 4 and 5) to laterally deflect the fabric layers of the discs. In this case the laminated fabric-rubber disc has on either side of each of its bolt holes 27 a fabric spreader in the shape of an elongated cylindrical roll 28. The latter is imbedded in the body of the disc, causing its layers to be oppositely deflected on either side so as to project beyond its normal plane or surface and cooperate with properly formed plates or washers engaged by bolts passing through the holes 27 to distribute over the body of the disc both toward the center and outwardly beyond said bolts, the torsional stresses encountered under operating conditions.

In providing for the relative angular adjustment of the two parts of the coupling, we may employ, as alternative to the construction shown in Figs. 1 and 2, any of the arrangements shown in Figs. 6 to 11 inclusive. In Figs. 6 and 9 for example, we have shown a flexible disc 10ª which may be connected in any desired manner, for example as shown in Fig. 1, to one end of a shaft. The second shaft is designed to be engaged by a sleeve 30 which has a median flange 31 formed with oppositely inclined faces and rotatably fitted into a suitably formed opening of a yoke 32 connected by bolts 33 to the disc 10ª. These same bolts pass respectively through slots 34 formed in a circular plate 35 having a central opening defined by a polygonal flange 36 designed to fit against the outer inclined face of a similarly formed flange 31 of the sleeve 30. Obviously the bolts 33 as in the former case, clamp the disc 10ª to the yoke arms and by slacking off the nuts on the said bolts 33, it is possible to rotate the sleeve 30 with its shaft through an angle of almost 90° in either direction from a central position, after which said nuts may be again tightened to clamp the parts in their operative power-transmitting positions.

Again as shown in Figs. 7 and 10, the sleeve 30ª may have welded or otherwise fixed to it a toothed structure 37 designed to abut upon a yoke 32, which as before is connected by bolts 33 with the flexible disc. Also mounted on each of said bolts is a toothed gear 38 whose teeth mesh with those of the toothed structure 37 and may be immovably clamped against the yoke 32 through washers 39 by the nuts carried by said bolts. In this case the sleeve 30ª with its attached shaft may be rotated into any desired angular position relatively to the flexible disc 10ª and to the second shaft connected thereto, after which the setting up of the nuts on the bolts 33 will cause the washers 39 to immovably clamp the toothed structure 37 against the yoke 32 and further prevent relative movement of the parts by immovably holding the gears 38.

In the construction shown in Figs. 8 and 11 we have shown a two-armed spider 40 having a hub 41 for connection to a shaft and connected by bolts 42 to the flexible disc 10ª. In this case the second shaft hub or sleeve 30ᵇ has a radial flange 43 and a tapering end designed to fit into a correspondingly tapered opening in a yoke 44 which is acted on by nuts on the bolts 46, through washers 45 to engage the flange and thus clamp the sleeve 30ᵇ to the yoke 44. Said bolts as well as the bolts 42, are preferably held from turning by lock washers 47 in the form of sheet metal plates mounted under their heads and each having one or more turned up tongues 48 positioned to engage one of the flat faces of the head under which it is mounted. In addition the plate is extended radially inward and has one of its extremities 49 turned at right angles so as to engage the edge of the central opening through the flexible disc 10ª.

In Figs. 12 and 13 we have shown a form of flexible coupling similar to that of Figs. 1 and 2, except that each of the spiders is formed with a series of projections in the form of teeth 60 and 61, projecting substantially parallel to the axis of rotation of the coupling and through the central opening of the disc or discs. In the present instance each of the spiders has three teeth whose center lines are approximately 120° apart and whose widths are such that while they intermesh they do not normally engage each other, but are held spaced apart, owing to the relation of the spider arms as determined by the flexible discs and the connecting bolts. With the above arrangement when the coupling is operating under normal conditions the teeth occupy the positions shown in Fig. 13, but if by reason of a suddenly applied or abnormal load the discs should yield or buckle to more than a predetermined extent, the teeth of the driving spider would come into engagement with the teeth of the driven spider and power would be transmitted directly between them, thus preventing stressing of the material of the discs beyond its elastic limit or other injury. When the abnormal stress is removed the natural elasticity of the discs causes the spiders to automatically return to their normal positions in which the teeth 60 and 61 are spaced apart.

In all of the above cases the bolts clamp the disc or discs between their heads and the spider or yoke into which they are threaded, and independently clamp the flange of a shaft-receiving sleeve to said spider so that by slacking the nuts on said bolts it may be given any desired angular adjustment.

Obviously without departing from my invention the discs may be so proportioned or the inner series of bolts so placed that, as shown in Figs. 11 and 12, they pass through the central opening of the disc or discs which are then clamped between the several clamping plates and the spiders, and lie wholly between the inner and outer series of bolts.

From the drawings and particularly Fig. 3, it is noted that the plates or washers 20 as well as the plates 22 have flat marginal portions extending parallel with the general planes of the flexible discs and outside of their curved ribs or corrugations 21, which flat portions engage the flat faces of said discs while their corrugations or ribs conform with the deflected portions of the discs, thus increasing the coacting surfaces of the plates and disc or discs.

I claim:

1. The combination in a flexible coupling of two spiders; at least one flexible disc; clamping plates; and sets of bolts connecting the spiders to the disc, one set of bolts extending through the spider, the disc and the clamping plate, and another set of bolts engaging the spider and the clamping plates independently of the disc.

2. The combination in a flexible coupling of two spiders; at least one flexible disc; sets of clamping plates; a plurality of sets of bolts connecting the spiders to the disc, each arm of each spider having bolts extending from it through the disc into clamping plates and also having a second bolt connecting it to the clamping plate independently of the disc.

3. The combination in a flexible coupling of two spiders; at least one flexible disc;

clamping plates formed to hold bodily deflections of the material of the disc; with a plurality of bolts for connecting the spiders to the disc, one set of bolts extending through a spider, the disc and a clamping plate and another set of bolts extending through the spider and clamping plates independently of the disc.

4. The combination in a flexible coupling of two spiders; at least one fabric disc; clamping plates formed to hold bodily deflections of the fabric of the disc; with a plurality of bolts for connecting the spiders to the disc, one set of bolts extending through a spider, the disc and a clamping plate and another set of bolts extending through the spider and clamping plates independently of the disc.

5. The combination in a flexible coupling of two spiders; at least one flexible disc; clamping plates; a plurality of sets of bolts for connecting the spiders to the disc of which one set extends through a spider, the disc and certain of the clamping plates and another set extends through the spider and the clamping plates outside of the disc; with a shaft-receiving sleeve connected to one of the spiders so as to be angularly adjustable relatively thereto.

6. The combination in a flexible coupling of two spiders; at least one flexible disc; clamping plates; a plurality of sets of bolts for connecting the spiders to the discs of which one set extends through a spider, the disc and certain of the clamping plates and another set extends through the spider and the clamping plates outside of the disc; with means acted on by one of said sets of bolts for connecting one of the spiders to a shaft to permit of its relative angular adjustment.

7. The combination in a flexible coupling of two spiders; at least one flexible disc; clamping plates; a plurality of sets of bolts for connecting the spiders to the discs, of which one set extends through a spider, the disc and certain of the clamping plates and another set extends through the spider and the clamping plate outside of the disc; with a shaft-receiving sleeve having a flange positioned to be adjustably clamped to one of the spiders by one of said sets of bolts.

8. The combination in a flexible coupling of two spiders; at least one flexible disc; clamping plates; bolts for connecting the spiders to the discs; with a shaft-receiving sleeve having an annular rib positioned to be adjustably clamped to one of the spiders independent of the disc by certain of the bolts threaded through the spider.

9. The combination in a flexible coupling of two spiders; at least one flexible disc; clamping plates; bolts for connecting the spiders to the discs; with a shaft-receiving sleeve having an annular rib positioned to be adjustably clamped to one of the spiders by certain of the bolts threaded through the spider, said annular rib and the latter spider having coacting surfaces at an angle to the line of the coupling.

10. The combination in a flexible coupling of a shaft-receiving sleeve having a flange; a spider having a portion rotatably mounted on said sleeve; at least one flexible disc; a second spider; and sets of bolts for connecting said discs to said spiders, one set of said bolts being threaded through the first spider and extended to adjustably clamp the first spider to the flange of the shaft-receiving sleeve to permit of the relative angular adjustment of the latter.

11. The combination in a flexible coupling of a shaft-receiving sleeve having a flange; a spider having a portion rotatably mounted on said sleeve; at least one flexible disc; a second spider; and sets of bolts for connecting said discs to said spiders, one set of said bolts being threaded through the first spider and extended to adjustably clamp the first spider to the flange of the shaft-receiving sleeve to permit of the relative angular adjustment of the latter, said sleeve and spider having angular coacting faces.

12. The combination in a flexible coupling of a shaft-receiving sleeve having a flange; a spider having a portion rotatably mounted on said sleeve; at least one flexible disc; a second spider; and sets of bolts for connecting said discs to said spiders, one set of said bolts being threaded through the first spider and extended to adjustably clamp the first spider to the flange of the shaft-receiving sleeve to permit of the relative angular adjustment of the latter, said sleeve and spider having coacting faces lying at an angle to the axis of rotation of the coupling.

13. The combination in a flexible coupling of a plurality of spiders; at least one disc mounted between said spiders; bolts and clamping plates for connecting the disc to the spiders, the latter and said plates having surface deformations adjacent the holes for said bolts for holding portions of the material of the disc out of its normal planes and certain of said bolts extending between the clamping plates and the spiders outside of the disc.

14. The combination in a flexible coupling of spiders; a plurality of flexible discs having bodily deflected portions; clamping plates; bolts extending between the plates and the spiders for clamping the discs thereto, said plates and spiders having surface deformations for coacting with the bodily deflected parts of the discs adjacent the bolt holes; and a plate mounted between the discs and having its surface shaped to fit the deformations of the adjacent portions of the discs, certain of the bolts extending between the clamping plates, the intermediate plates and the spiders outside of the discs.

15. The combination, in a flexible coupling, of two spiders, of which one has a clamping surface inclined to its axis, at least one flexible disk connected to said spiders; a shaft receiving sleeve having an inclined face adapted to bear against the inclined face of the spider to permit relative angular adjustment of the normal axes of said sleeve and spider; with means for adjustably clamping said sleeve with its inclined face in engagement with the inclined face of the spider.

16. The combination in a flexible coupling of two spiders; a flexible disc; bolts connecting said spiders with said disc, one of the spiders having an inclined clamping face; a shaft-receiving sleeve having two oppositely inclined clamping faces; and means coacting with certain of the bolts for clamping said sleeve to one of the spiders with one of its inclined faces in engagement with the inclined face thereof to permit of the relative angular adjustment of the sleeve.

17. The combination in a flexible coupling of two spiders; a flexible disc; sets of bolts connecting the spiders with said disc, of which one set is threaded into one spider; a flanged shaft-receiving sleeve; and means held by said latter set of bolts for adjustably clamping the sleeve to said latter spider.

18. The combination in a flexible coupling of two spiders; a flexible disc; sets of bolts connecting the spiders with said disc, of which one set is threaded into one spider; nuts on said latter bolts; a shaft-receiving sleeve having a flange; and plates on said bolts between the spider and the nuts, engaging the flange of the sleeve to adjustably clamp it to said spider.

19. The combination in a flexible coupling of two spiders, of which one has a tapering opening; a flexible disc mounted between the spiders; bolts connecting the spiders to the disc; a flanged element having a tapering portion fitting into the tapering opening of the spider; and plates engaging the flange of said element to clamp it to the spider.

20. The combination in a flexible coupling of two spiders, of which one has a tapering opening; a flexible disc mounted between the spiders; bolts connecting the spiders to the disc; a flanged element having a tapering portion fitting into the tapering opening of the spider; and plates engaging the flange of said element to clamp it to the spider, said plates being mounted on certain of the bolts for connecting one of the spiders to the disc.

21. The combination in a flexible coupling of two spiders; clamping plates; at least one disc between the spiders; and sets of bolts connecting the spiders to the disc; at least one set of bolts engaging each spider and certain of the clamping plates independently of the disc.

POWELL EVANS.
ALEXANDER T. WILSON.